United States Patent
Baugh et al.

[11] Patent Number: 5,856,790
[45] Date of Patent: Jan. 5, 1999

[54] REMOTE CONTROL FOR A PLUG-DROPPING HEAD

[75] Inventors: John Lindley Baugh, Houston; Steven C. Owens, Katy; David E. Rothers; Michael W. Holcombe, both of Houston, all of Tex.

[73] Assignee: Baker Hughes Incorporated, Houston, Tex.

[21] Appl. No.: 644,889

[22] Filed: May 10, 1996

Related U.S. Application Data

[62] Division of Ser. No. 68,513, May 27, 1993, Pat. No. 5,435,390.

[51] Int. Cl.$^6$ .................................................. G01V 3/00
[52] U.S. Cl. ................................. 340/854.6; 340/855.4; 340/855.3; 340/870.26; 166/250.01; 175/40
[58] Field of Search ..................... 340/870.26, 870.16, 340/854.6, 854.3, 855.4, 855.5; 166/250.01; 175/40, 50

[56] References Cited

U.S. PATENT DOCUMENTS

| | | | |
|---|---|---|---|
| 4,317,486 | 3/1982 | Harris | 166/250 |
| 4,354,278 | 10/1982 | Clark et al. | 340/870.18 |
| 4,427,065 | 1/1984 | Watson | 166/250 |
| 4,468,762 | 8/1984 | Jurgens | 367/83 |
| 4,671,353 | 6/1987 | Daming | 166/70 |
| 4,721,158 | 1/1988 | Merritt, Jr. et al. | 166/250 |
| 4,767,280 | 8/1988 | Markuson et al. | 417/44 |
| 4,782,894 | 11/1988 | LaFleur | 166/70 |
| 4,854,383 | 8/1989 | Arnold et al. | 166/70 |
| 4,924,482 | 5/1990 | Shimizu et al. | 375/65 |
| 5,040,603 | 8/1991 | Baldridge | 166/291 |
| 5,095,988 | 3/1992 | Bode | 166/291 |
| 5,142,534 | 8/1992 | Simpson et al. | 370/95.1 |
| 5,191,937 | 3/1993 | Cook, Sr. | 166/363 |
| 5,279,305 | 1/1994 | Zimmerman et al. | 128/731 |
| 5,293,933 | 3/1994 | Brisco | 166/70 |
| 5,383,044 | 1/1995 | Borchardt et al. | 359/145 |
| 5,435,390 | 7/1995 | Baugh et al. | 166/20 |

FOREIGN PATENT DOCUMENTS

| | | |
|---|---|---|
| 0 456 397 A1 | 11/1991 | European Pat. Off. . |
| 2 508 095 | 3/1982 | France . |
| 0 249 745 A2 | 12/1987 | Germany . |
| 59-44135 | 3/1984 | Japan . |

*Primary Examiner*—J. Woodrow Eldred
*Attorney, Agent, or Firm*—Rosenblatt & Redano P.C.

[57] ABSTRACT

An apparatus and method of dropping a pumpdown plug or ball is revealed. The assembly can be integrally formed with a plug-dropping head or can be an auxiliary feature that is mounted to a plug-dropping head. The release mechanism is actuated by remote control, employing intrinsically safe circuitry. The circuitry, along with its self-contained power source, actuates a primary control member responsive to an input signal so as to allow component shifting for release of the pumpdown plug or ball. Multiple plug-dropping heads can be stacked, each responsive to a discrete release signal. Actuation to drop the pumpdown ball or plug is accomplished even while the components are rotating or are moving longitudinally. Using the apparatus and method of the present invention, personnel do not need to climb up in the derrick to actuate manual valves. There is additionally no need for a rig floor-mounted control panel with hydraulic lines extending from the control panel to remotely located valves for plug or ball release.

6 Claims, 11 Drawing Sheets

I.R. TRANSMITTER

FIG. 9 I.R. TRANSMITTER

I.R. RECEIVER

REMOTE CONTROL FOR A PLUG-DROPPING HEAD

This is a divisional of application Ser. No. 08/068,513, filed on May 27, 1993, now U.S. Pat. No. 5,435,390, issued Jul. 25, 1995.

FIELD OF THE INVENTION

The field of this invention relates to methods and devices usable in the field of oil and gas exploration and production, more specifically devices and methods related to cementing operations involving the cementing of a liner by dropping or by pumping down a plug.

BACKGROUND OF THE INVENTION

Cementing operations have involved the use of plugs as a way of correctly positioning the cement when setting a liner. Some mechanisms have employed the use of pressure or vacuum to initiate plug movement downhole for proper displacement of the cement to its appropriate location for securing the liner properly. The early designs were manual operations so that when it was time to release a plug for the cementing operation, a lever was manually operated to accomplish the dropping of the plug. This created several problems because the plug-dropping head would not always be within easy access of the rig floor. Frequently, depending upon the configuration of the particular well being drilled, the dropping head could be as much as 100 ft. or more in the derrick. In order to properly actuate the plug to drop, rig personnel would have to go up on some lift mechanism to reach the manual handle. This process would have to be repeated if the plug-dropping head had facilities for dropping more than one plug. In those instances, each time another plug was to be dropped, the operator of the handle would have to be hoisted to the proper elevation for the operation. In situations involving foul weather, such as high winds or low visibility, the manual operation had numerous safety risks. Manual operations used in the past are illustrated in U.S. Pat. No. 4,854,383. In that patent, a manual valve realignment redirected the flow from bypassing the plug to directly above it so that it could be driven downhole.

Hydraulic systems involving a stationary control panel mounted on the rig floor, with the ability to remotely operate valves in conjunction with cementing plugs, have also been used in the past. Typical of such applications is U.S. Pat. No. 4,782,894. Some of the drawbacks of such systems are that for unusual applications where the plug-dropping head turned out to be a substantial distance from the rig floor, the hoses provided with the hydraulic system would not be long enough to reach the control panel meant to be mounted on the rig floor. Instead, in order to make the hoses deal with these unusual placement situations, the actual control panel itself had to be hoisted off the rig floor. This, of course, defeated the whole purpose of remote operation. Additionally, the portions of the dropping head to which the hydraulic lines were connected would necessarily have to remain stationary. This proved somewhat undesirable to operators who wanted the flexibility to continue rotation as well as up or down movements during the cementing operation. Similar such remote-control hydraulic systems are illustrated in U.S. Pat. Nos. 4,427,065; 4,671,353.

Yet other systems involve the pumping of cement on the rig floor to launch a ball or similar object, the seating of which would urge the cementing plug to drop. Typical of such a system is U.S. Pat. No. 5,095,988. U.S. Pat. No. 4,040,603 shows the general concept of a plug-release mechanism using a hydraulic circuit mounted on the rig floor. U.S. Pat. No. 5,033,113 shows generally the concept of using an infrared receiver to trigger the operation of a device such as an electric fan.

One type of previously used plug-dropping head is the model TD put out by Baker Oil Tools. This device has a plug stop to retain the plug, with a shifting sleeve which in a first position allows the flow to bypass around the plug being retained by the plug stop. Upon manual turning of a set screw, the sleeve shifts, allowing the plug stop to pivot so that the plug is released. The shifting of the sleeve also closes the bypass around the sleeve and forces pressure on top of the plug so that it is driven down into the wellbore in the cementing operation.

The apparatus of the present invention has been designed to achieve several objectives. By putting together an assembly that can be actuated by remote control from a safe location on the rig floor, the safety aspects of plug dropping have been improved. No longer will an operator be required to go up in the derrick to actuate a single or multiple levers in the context of liner cementing. Use of the apparatus and method of the present invention also eliminates numerous hydraulic hoses that need to be extended from a control panel to the final element necessary to be operated to allow the plug to drop. The plug can be dropped while the rotary table is in operation such that not only rotation but movement into and out of the wellbore is possible as the plug is being released to drop. The equipment is designed to be intrinsically safe to avoid any possibility of creation of a spark which could trigger an explosion. The equipment is compact and economically accomplishes the plug-dropping maneuver while the operator stands in a safe location on the rig floor. The actuation to drop can be accomplished on the fly while the plug-dropping head is being rotated or being moved longitudinally. Plug-dropping heads can be used in tandem and be made to respond to discrete signals. This ensures that the plugs are released in the proper order from a safe location on the rig.

SUMMARY OF THE INVENTION

An apparatus and method of dropping a pumpdown plug or ball is revealed. The assembly can be integrally formed with a plug-dropping head or can be an auxiliary feature that is mounted to a plug-dropping head. The release mechanism is actuated by remote control, employing intrinsically safe circuitry. The circuitry, along with its self-contained power source, actuates a primary control member responsive to an input signal so as to allow component shifting for release of the pumpdown plug or ball. Multiple plug-dropping heads can be stacked, each responsive to a discrete release signal. Actuation to drop the pumpdown ball or plug is accomplished even while the components are rotating or are moving longitudinally. Using the apparatus and method of the present invention, personnel do not need to climb up in the derrick to actuate manual valves. There is additionally no need for a rig floor-mounted control panel with hydraulic lines extending from the control panel to remotely located valves for plug or ball release.

DETAILED DESCRIPTION OF THE PREFERRED EMBODIMENT

Figure 1:
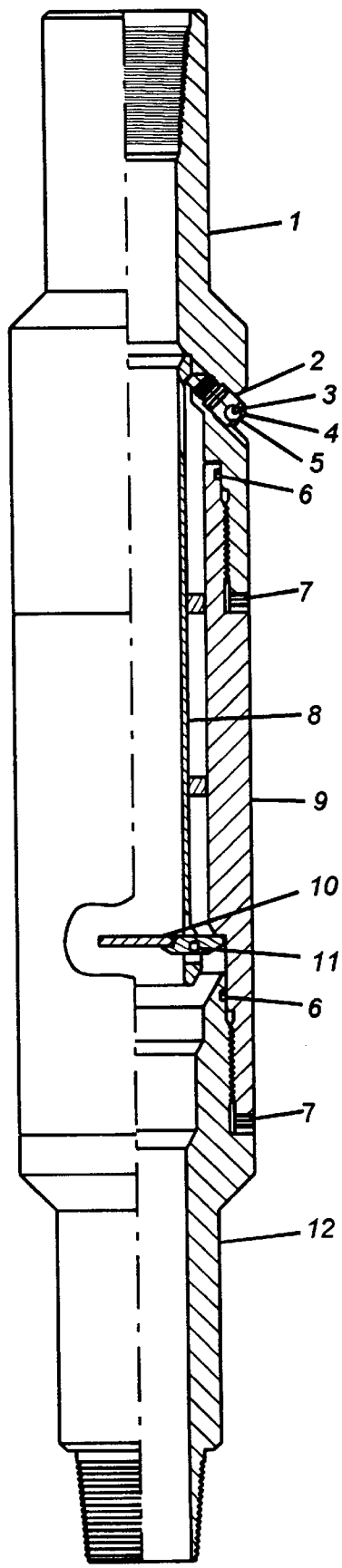
FIG. 1 shows an existing prior art plug-dropping head for which a preferred embodiment has been developed.

FIG. 1 illustrates a prior art plug-dropping head available from Baker Oil Tools. The preferred embodiment of the apparatus and invention has been configured to be mountable to the plug-dropping head illustrated in FIG. 1 as an addon attachment. However, those skilled in the art will appreciate that an integral plug-dropping head, with the remote-release mechanism which will be described, can be provided without departing from the spirit of the invention.

In the prior design shown in FIG. 1, a top connection 1 is supported from the derrick in the customary manner. Top connection 1 is connected to a mandrel 9, which is in turn connected to a bottom connection 12. Inside mandrel 9 is sleeve 8. At the bottom of sleeve 8 is plug stop 10, which is connected by roll pin 11 to sleeve 8. In the position shown in FIG. 1, plug stop 10 would retain a ball or plug above it since it extends transversely into the central flowpath. With the sleeve 8 shown in the position in FIG. 1, flow bypasses a plug (not shown) which is disposed atop plug stop 10. Flow which comes in through top connection 1 circulates through a bypass passage 13 until it is time to drop the ball or plug. At that time, set screw 3 is operated and turned 180° manually. The turning of set screw 3 releases its hold on sleeve 8 and allows sleeve 8 to drop down. As a result of sleeve 8 dropping down, plug stop 10 can pivot around roll pin 11 and the plug or ball is released. Additionally, sleeve 8 comes in contact with bottom connection 12, thereby sealing off bypass passage 13. Thereafter, circulation into top connection 1 can no longer go through bypass passage 13 and must necessarily bear down on the ball or plug in the central port or passage 15, which results in a pressure being applied above the plug or ball to drive it through bottom connection 12 and into the liner being cemented in the well.

As previously stated, the operation described in the previous paragraph, with regard to the prior art tool of FIG. 1, at times necessitated sending personnel significant distances above the rig floor for manual operation of set screw 3. Of course, rotation and longitudinal movement of the tool shown in FIG. 1 had to stop in order for set screw 3 to be operated to release sleeve 8.

Figure 2A:
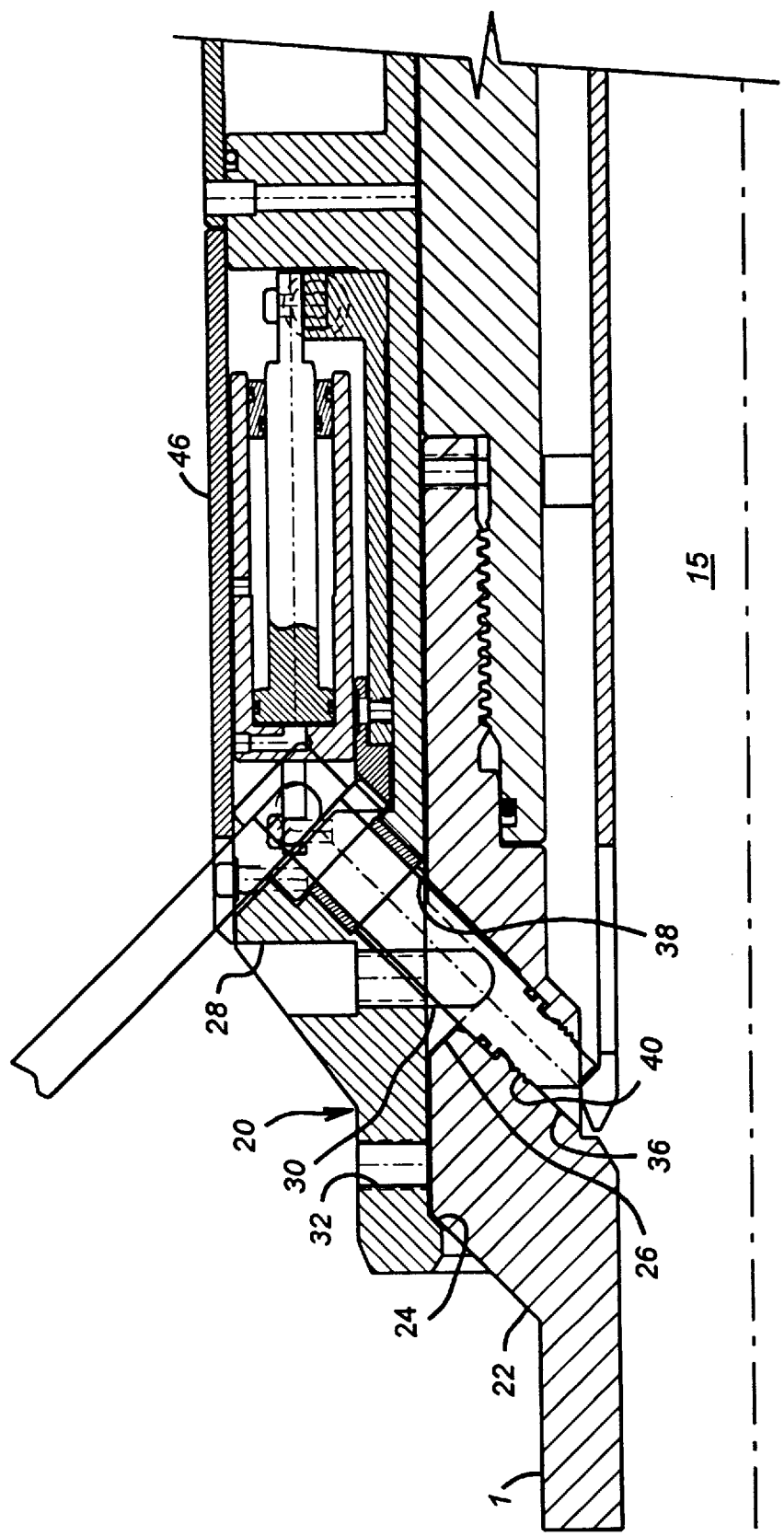
FIGS. 2A and 2B illustrate the plug-dropping head of FIG. 1, with a few parts removed for clarity, illustrated with the release mechanism of the apparatus and method of the present invention installed and ready to release.
Figure 2B:
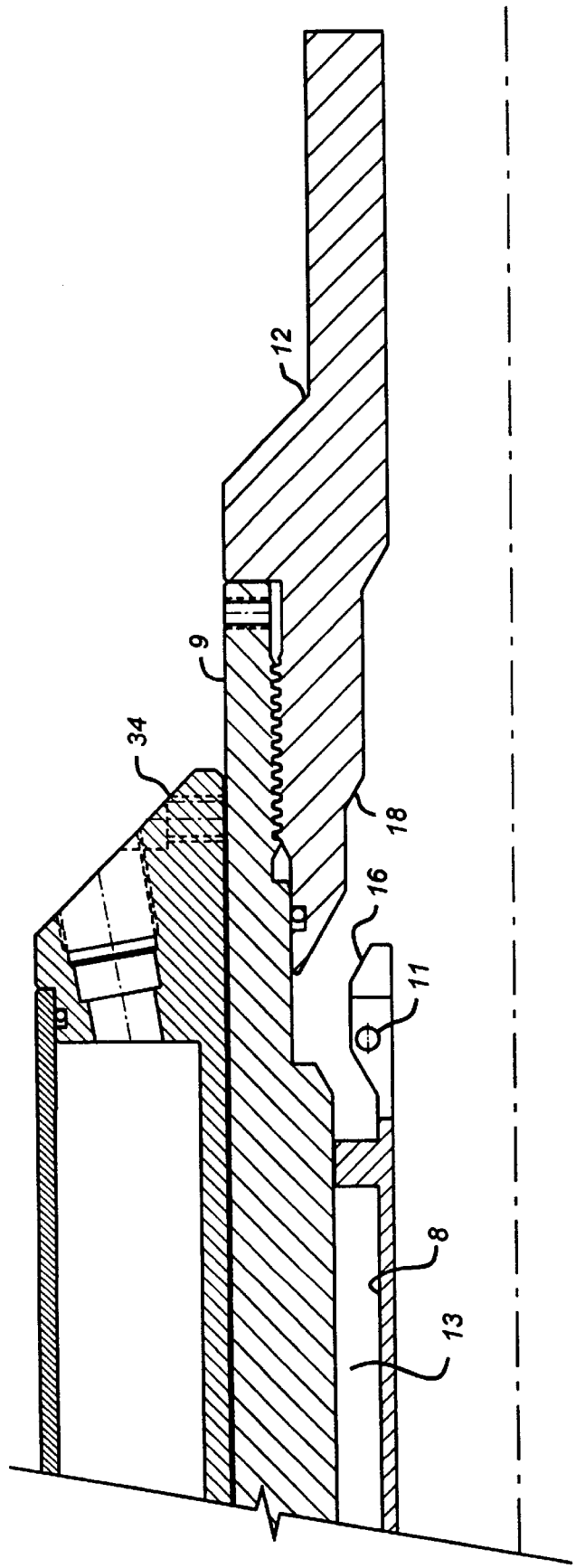

Referring now to FIG. 2, the tool in FIG. 1 is shown with many of the component omitted for clarity. At the top, again, is top connection 1, which is connected to mandrel 9, which is in turn connected to bottom connection 12. Sleeve 8 sits within mandrel 9, and pin 11 secures the plug stop (not shown) in the position to retain a ball or plug in the position shown in FIG. 2. It should be noted that the tool shown in FIG. 1 is in the same position when shown in FIG. 2. That is, the plug stop 10 retains the plug while the flow goes around the sleeve 8, through the passage 13. Ultimately, when sleeve 8 shifts, tapered surface 16 contacts tapered surface 18 on bottom connection 12 to seal off passage 13 and to direct flow coming into top connection 1 through the central passage 15 to drive down the ball or plug into the wellbore.

Figure 6:
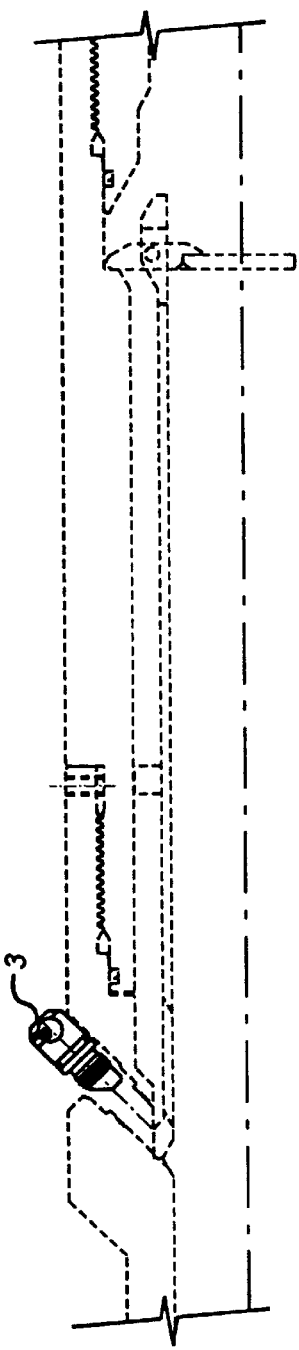
FIG. 6 is a detail of FIG. 1, showing the existing pin which is changed to accept the invention.

However, there is a difference between the assembly shown in FIG. 2 and the assembly shown in FIG. 1. Set screw 3 of FIGS. 1 and 6 has been replaced by a totally different assembly which eliminates the manual operation with respect to the embodiment shown in the prior art of FIG. 1. Instead, a housing 20 has been developed to fit over top connection 1 until it comes to rest on tapered surface 22. The housing 20 has a mating tapered surface 24 which, when it contacts tapered surface 22, longitudinally orients housing 20 with respect to top connection 1.

Rotational orientation is still properly required. To accomplish this, at least one orienting groove or cutout 26 has been machined into top connection 1. For each cutout 26 there is an alignment bore 28 in housing 20. A bolt 30 is advanced through threaded bore 28 until it sticks into and firmly engages cutout 26. Once at least one bolt 30 is inserted into a cutout 26, the radial orientation between housing 20 and top connection 1 is obtained. That orientation can be secured with set screws (not shown) inserted through threaded bores 32 and 34. At that point, not only is housing 20 properly oriented, but its orientation is properly secure. As a result of such orientation, bore 36 in top connection 1 is aligned with bore 38 in housing 20. Bores 36 and 38 are disposed at an angle with respect to the longitudinal axis of top connection 1. A preferably square thread 40 is located in bore 36. Instead of set screw 3 (see FIG. 6), a pin 42 (see FIG. 7) is installed through aligned bores 36 and 38. Threads 44 on pin 42 engage thread 40 in bore 36.

Figure 7:
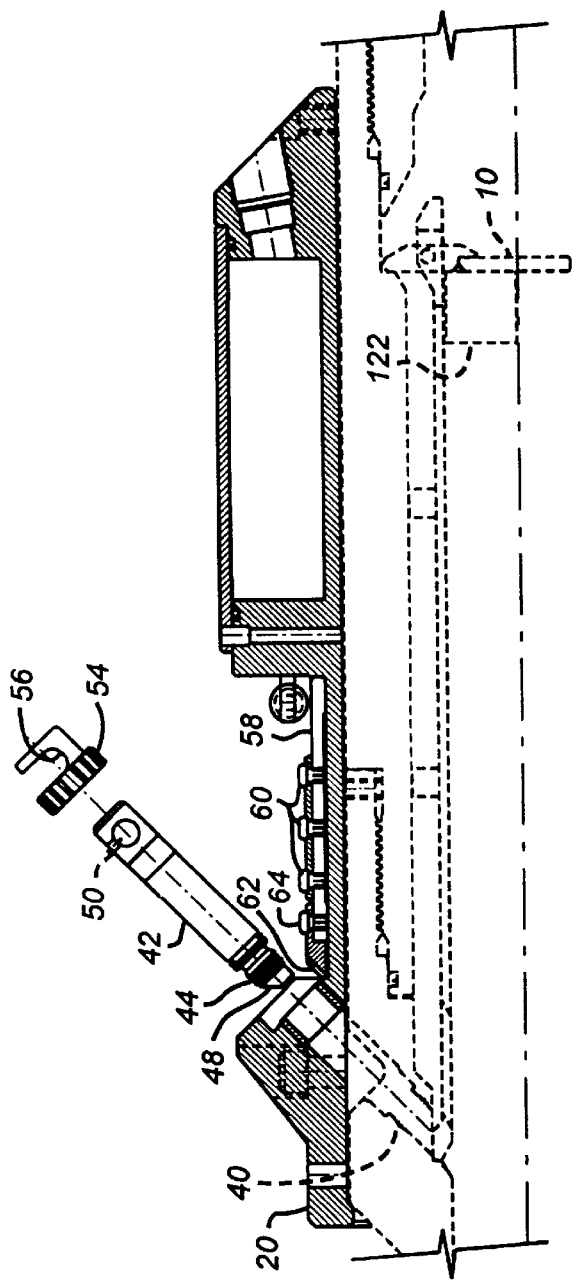
FIG. 7 is a sectional elevational part exploded view of the apparatus.

FIG. 7 outlines the assembly procedures for the installation of pin 42. After aligning housing 20, as previously described, the cover 46 (see FIG. 2) is removed, allowing access to bore 38 for installation of pin 42. Pin 42 is advanced and rotated into threads 40 until tapered surface 48 is in an orientation about 180° opposed from that shown in FIG. 7. The orientation of surface 48 is determined by the orientation of bore 50, which does not extend all the way through pin 42. Bore 50 is designed to accept a handle 52 (see FIG. 2). The orientation of tapered surface 48 is known by the orientation of bore 50. Having aligned tapered surface 48 in a position about 180° opposed from that shown in FIG. 7, the gear 54 is fitted over pin 42 and handle 52 is extended into bore 50. By extending handle 52 through catch 56 on gear 54, the longitudinal positioning of gear 54 with respect to pin 42 is accomplished. Additionally, the orientation of catch 56 allows initial rotation of both pin 42 and gear 54 to get them into the set position shown in FIG. 2.

Prior to securing the gear 54 onto pin 42, a pair of split sleeves 58 are fitted to housing 20 and secured to each other by fasteners 60. A rack 62 (see FIG. 8) is secured to sleeves 58 via fasteners 64 (see FIG. 7).

Figure 5:
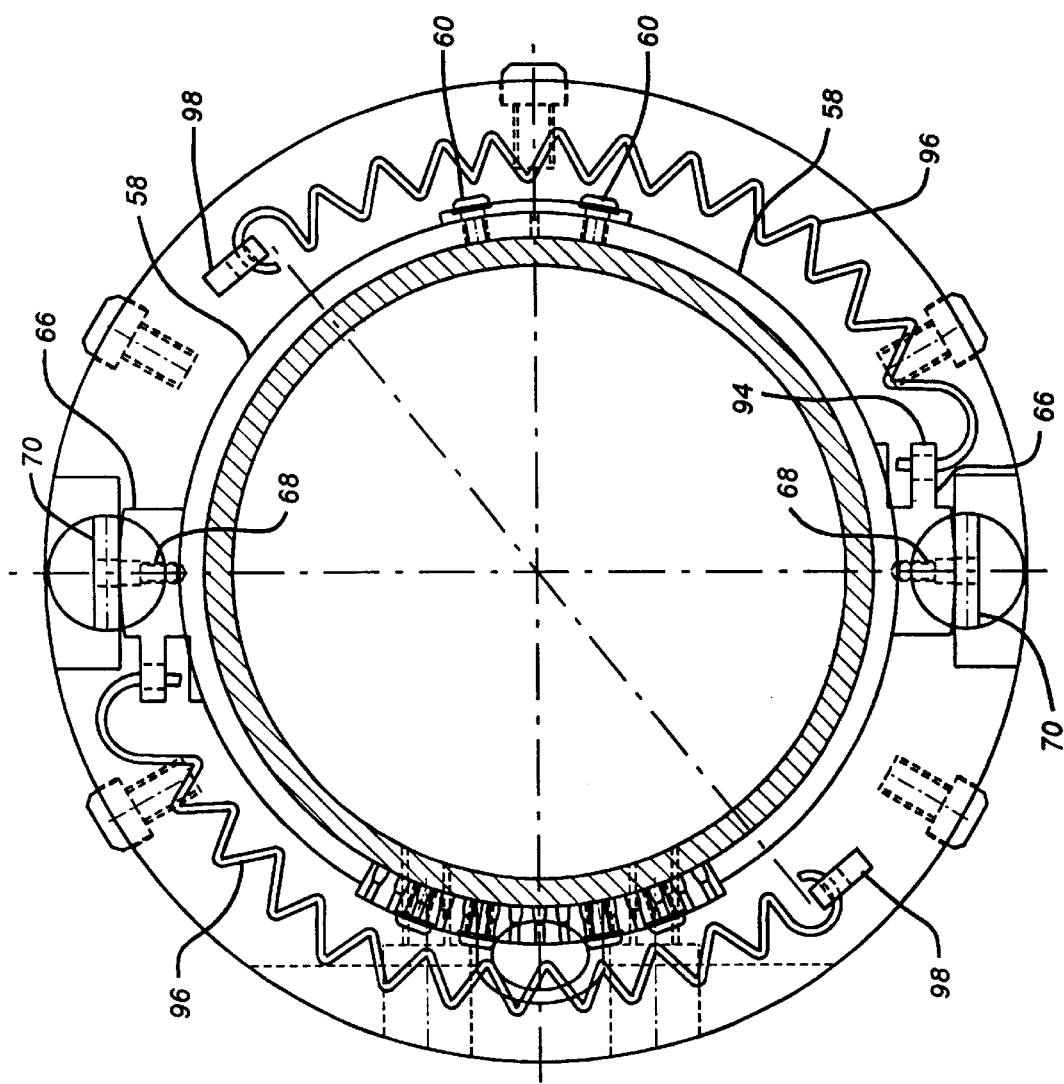
FIG. 5 is an end view of the view shown in FIG. 2, illustrating the spring action feature.
Figure 8:
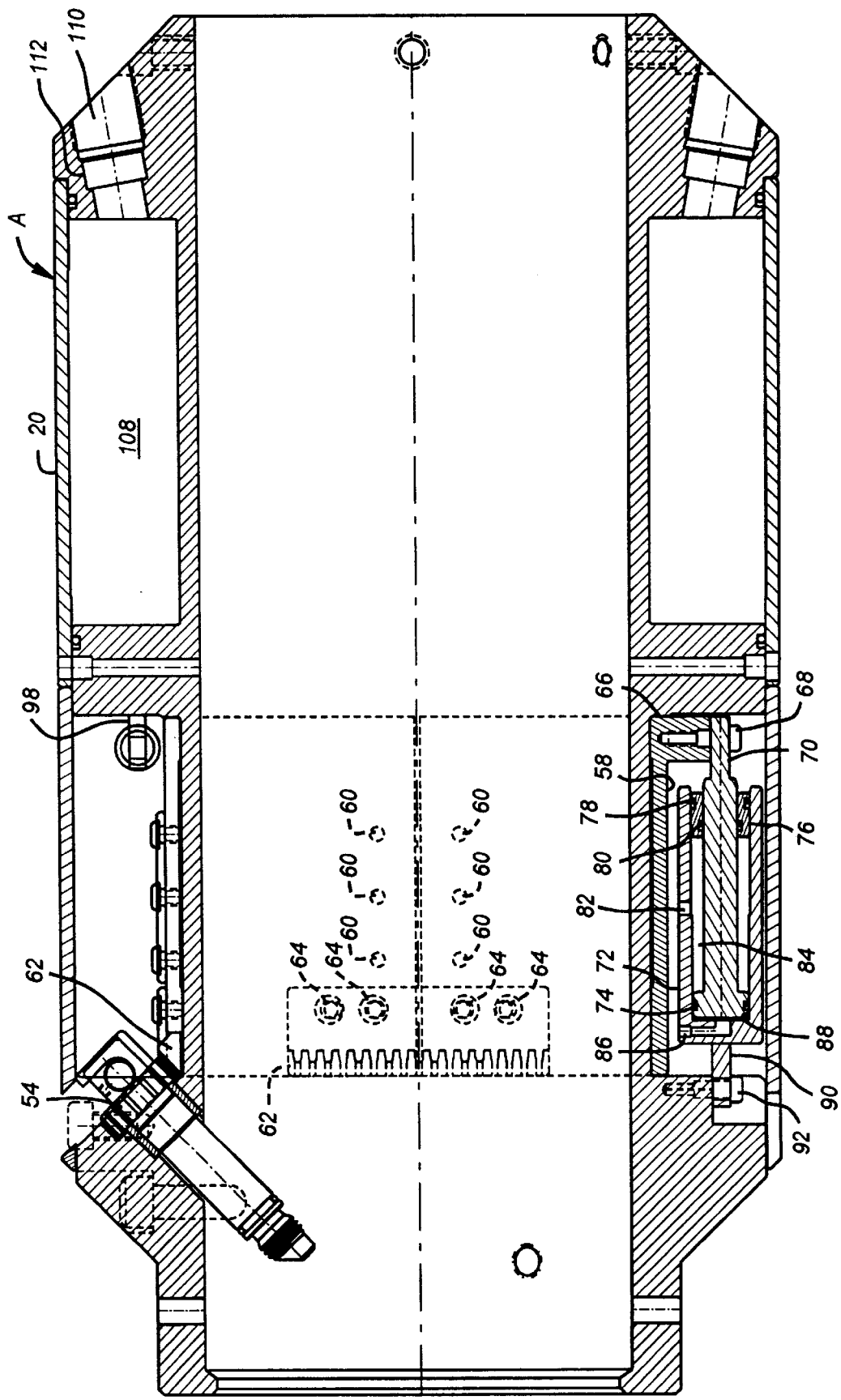
FIG. 8 is a sectional view of the apparatus showing the rack.

As shown in FIG. 8, gear 54 meshes with rack 62 such that rotation of pin 42 will rotate sleeves 58. Also connected to sleeves 58, as shown in FIG. 8, are lug or lugs 66. In the preferred embodiment there are two lugs 66 secured to sleeves 58 (see FIG. 5). Typically for each one, a bolt 68 extends through a piston 70 to secure the piston 70 to lug 66 (see FIGS. 5 and 8). The piston 70 is an elongated member that extends through a cylinder 72 and is sealed thereto by O-ring seal 74. Disposed between piston 70 and cylinder 72 is floating piston 76, which is sealed against cylinder 72 by seal 78 and it is further sealed against piston 70 by seal 80. A first port 82 allows fluid communication into cavity 84, which is formed between cylinder 72 and piston 70 and between seal 74 on piston 70 and seal 80 on floating piston 76. A second port 86 is also disposed in cylinder 72 and communicates with cavity 88. Cavity 88 is disposed between piston 70 and cylinder 72 on the other side of seal 74.

Cylinder 72 has a mounting lug 90. Bolt 92 secures cylinder 72 in a pivotally mounted orientation to housing 20.

Referring back to lugs 66, each has a bracket 94 (see FIG. 5) to secure an end of spring 96. A lug 98 is rigidly mounted to housing 20 (see FIG. 8) and secures the opposite end of spring 96. Spring 96 extends spirally around sleeves 58.

It should be noted that while one particular piston cylinder assembly has been described, a plurality of such identical assemblies or similar assemblies can be used without departing from the spirit of the invention. There are two in the preferred embodiment. In essence, the preferred embodiment illustrates the preferred way to accomplish a desired movement which is responsive to a particular signal for remote release of the ball or plug.

Figure 3:
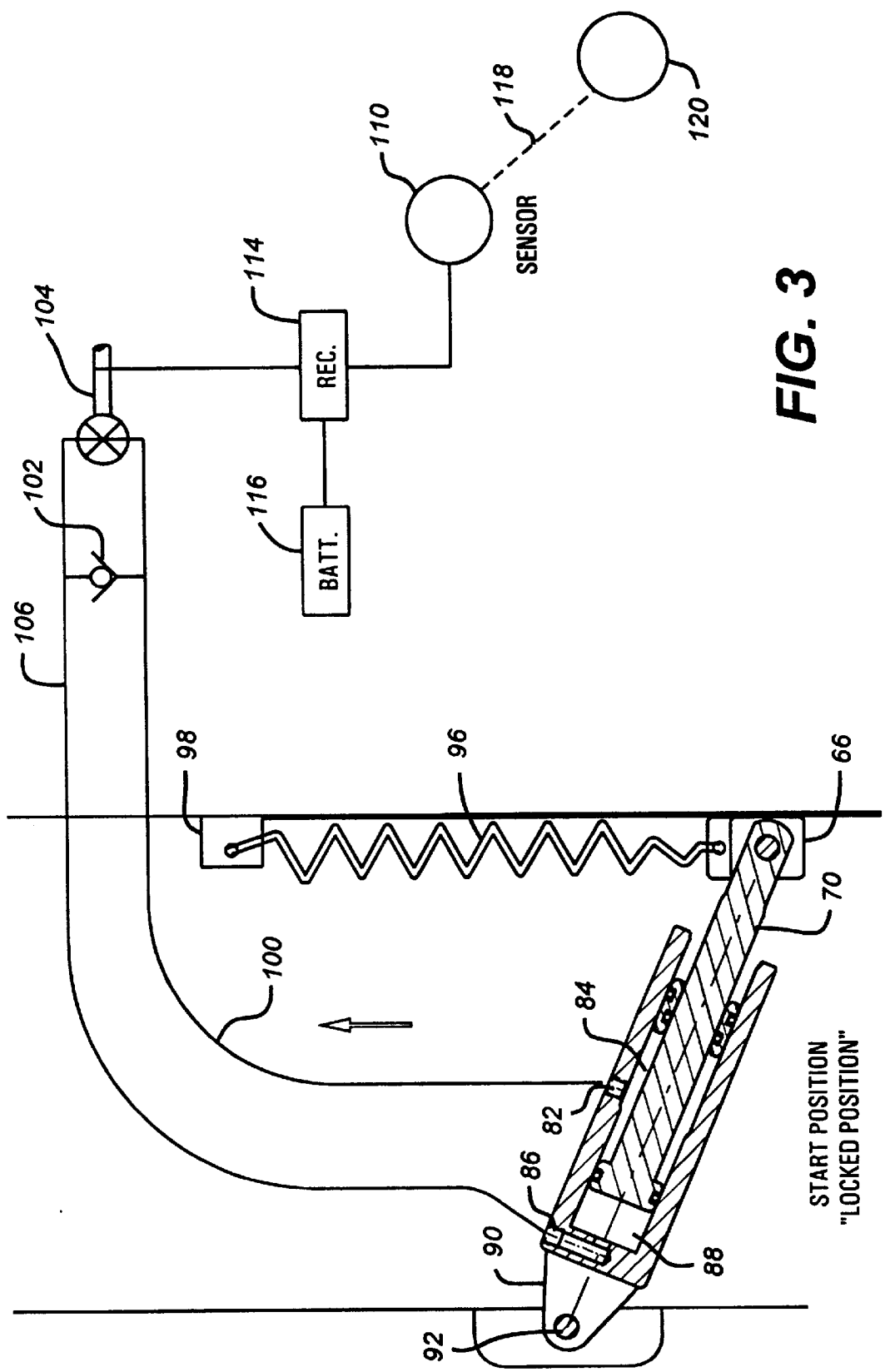
FIG. 3 illustrates the piston/cylinder combination in the initial position before release of the plug.

The first port 82 has a line 100 leading to a check valve 102 and a commercially available, intrinsically safe solenoid valve 104 mounted in parallel (see FIG. 3). The use of check valve 102 is optional. Coming out of solenoid valve 104 is line 106 which leads back to second port 86. Cavities 84 and 88, as well as lines 100 and 106 are filled with an incompressible fluid. Solenoid valve 104 is electrically operated and is of the type well-known in the art to be intrinsically safe. This means that it operates on such low voltage or current that it will not induce any sparks which could cause a fire or explosion. The electrical components for the apparatus A of the present invention are located in compartment 108 of housing 20 (see FIG. 8). A sensor 110 (see FIGS. 3 and 8) is mounted in each of bores 112 in housing 20. Each of the sensors 110 is connected to the electronic control system 114. The power for the electronic control system 114 comes from a battery 116. Sensor 110 receives over the air a signal 118 from a control 120. In the preferred embodiment, the drilling rig operator holds the control 120 in his hand and points it in the direction of sensors 110, which are distributed around the periphery of housing 20 and oriented in a downward direction. The preferred embodiment has six sensors 110. The rig operator points the control 120, which is itself an intrinsically safe device, which emits a signal 118 that ultimately makes contact over the air with one of sensors 110. The signal can be infrared or laser or any other type of signal that goes over the air and does not create any explosive fire or other hazards on the rig. The effect of a signal 118 received at a sensor 110 is to actuate the control system 114 to open solenoid valve 104.

Figure 4:
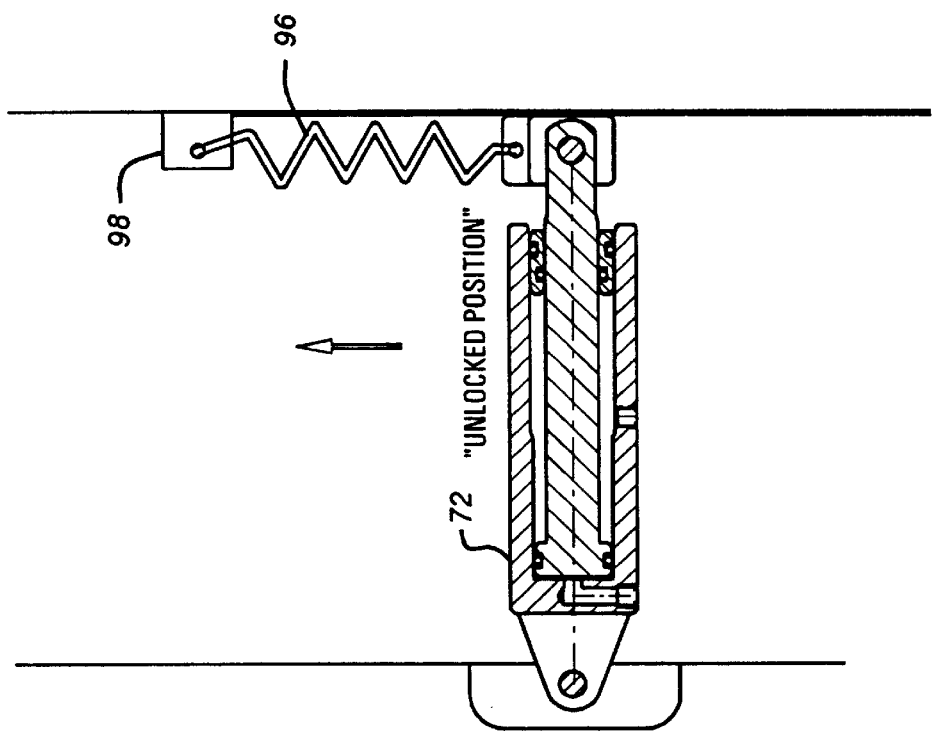
FIG. 4 is the same piston/cylinder combination of FIG. 3 in the unlocked position after plug release.

However, prior to explaining the actuation of the release, the initial set-up of the apparatus A needs to be further explained. As previously stated, pin 42 is installed in a position which is the fully released position. That position is, in effect, about 180° different from the orientation shown in FIG. 2. With that initial installation, gear 54 is secured to rack 62. At that point in time, the cylinder 72 is disposed in the position shown in FIG. 4, with the spring 96 fully relaxed except for any preload, if built in. When handle 52 is given a 180° rotation, it moves rack 62, which is connected to sleeves 58 as are lugs 66. Accordingly, 180° rotation of handle 52 has the net effect of rotating lugs 66 away from bracket or brackets 98 about 30°–45°. The difference in position of lugs 66 with respect to bracket 98 is seen by comparing FIGS. 3 and 4.

As a result of the 180° rotation of handle 52, pin 42 is now in the position shown in FIG. 2. By moving lugs 66 away from bracket 98, spring 96 has been stretched. In order to accommodate the rotational movement induced by handle 52, piston 70 must move to a position where it is more extended out of cylinder 72. In making this movement, cavity 88 must grow in volume while cavity 84 shrinks in volume. As a result, there is a net transfer of fluid, which could be oil or some other hydraulic fluid, through conduit 100 as cavity 84 is reduced in volume, through check valve 102, if used, and back into conduit 106 to flow into cavity 88 which is increasing in volume. During this time, of course, floating piston 76 experiences insignificant net differential pressure and merely moves to accommodate the change in volume of cavity 84. It should be noted that if check valve 102 is not used, the operator must use control 120 to trigger valve 104 to open prior to rotating handle 52. This is because without check valve 102, if valve 104 remains closed, it will not be possible to turn handle 52 because the rack 62 will not be free to move because piston 70 will be fluid-locked against movement into or out of cylinder 72. Therefore, if an assembly is used without check valve 102, the operator must ensure that valve 104 stays open as the orientation is changed from that shown in FIG. 4 to that shown in FIG. 3. In the preferred embodiment, a timer can be placed on valve 104 so that when it is triggered to open by control 120, it stays open for a predetermined time (about 4 minutes), thus giving the components time to make their required movements, both in the set-up and the release modes.

The result of the initial rotation of handle 52 about 180° in the preferred embodiment is that pin 42 suspends sleeve 8, which keeps plug stop 10 supporting the ball or plug 122 (see FIG. 7).

When it is time to release the ball or plug 122, the operator, standing in a safe location on the rig floor, aims the control 120 toward sensors 110. Having made contact over the air with a signal 118 transmitted from control 120 to one of the sensors 110, the control system 114 is actuated to open valve 104. When valve 104 is opened, the force in expanded spring 96 draws lugs 66 rotationally toward bracket 98. This is allowed to happen as fluid is displaced from cavity 84 through line 100 through valve 104 back through line 106 to cavity 88. As lug 66 rotates due to the spring force which is now no longer opposed by the hydraulic lock provided by having valve 104 in the closed position, the rotation of sleeve 58 rotates rack 62, which in turn rotates gear 54, which in turn rotates pin 42 from the position shown in FIG. 2 approximately 180° . This results in the release of sleeve 8 so that it can shift downwardly as previously explained. The downward shifting of sleeve 8 allows plug stop 10 to pivot on roll pin 11, thus removing the support for the ball or plug 122. The ball or plug 122 can drop. Its downward progress toward the liner being cemented can also be assisted by pumping down on top of the plug due to passage 13 being cut off upon shifting of sleeve 8, as in the original design shown in FIG. 1.

It should be noted that the housings 20 can be stacked in series, each equipped with sensors 110 that respond to different signals so that if there is a stack of housings 20 in use for a particular application requiring several plugs to be dropped, the sensitivity of sensors 110 on different housings 20 to different signals ensures that the plugs are dropped in the proper order. Accordingly, a separate controller 120 is provided for each apparatus A to be used in series, and aiming one controller with a discrete signal to a sensor 110 will not actuate the apparatus A unless the specific signal that sensor 110 is looking for is received. Alternatively, a single controller 120 can be programmed to give different signals 118 in series to accomplish release in the proper sequence.

Figure 9:
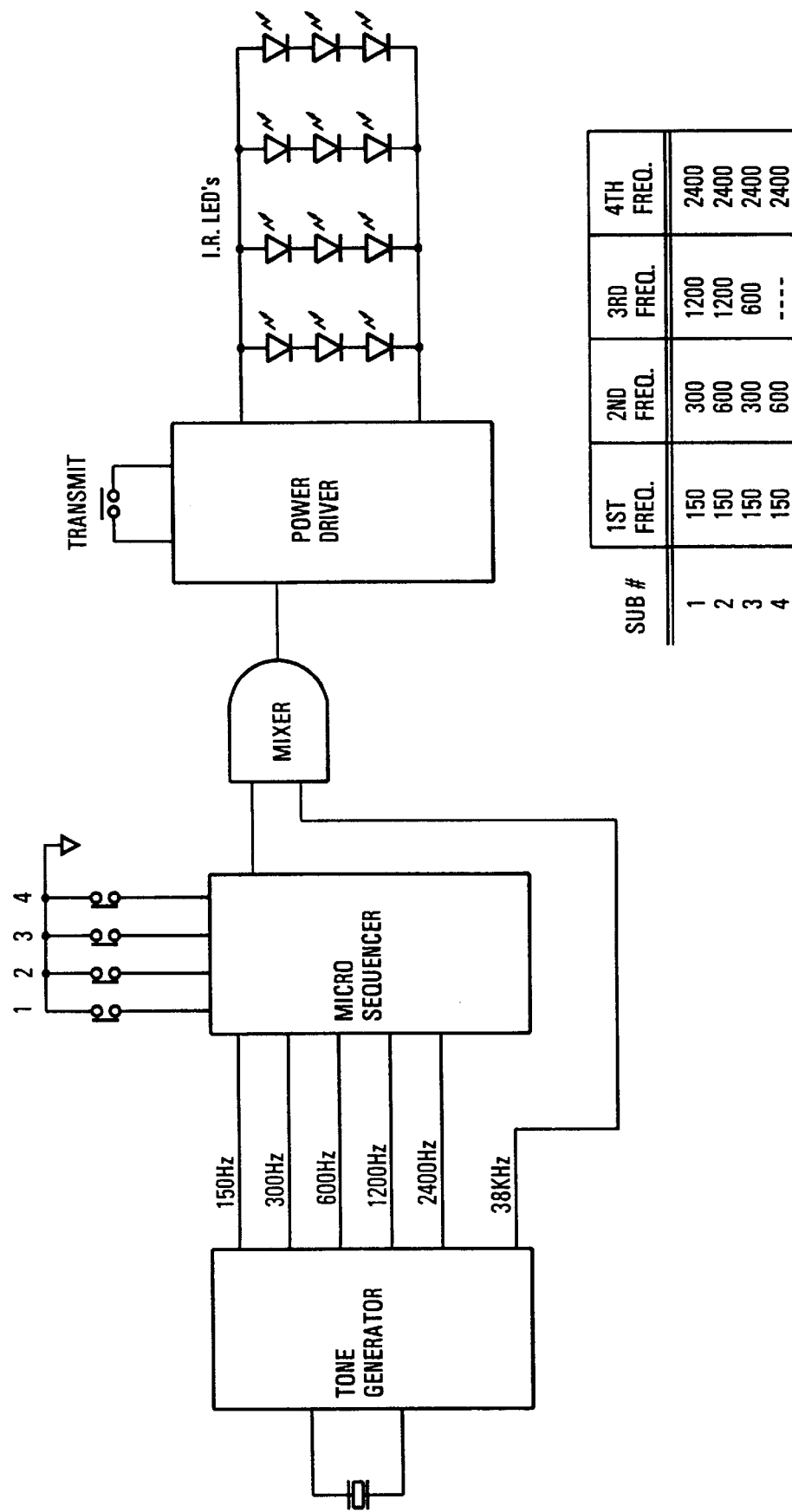
FIG. 9 is an electrical schematic representation of the transmitter used in the invention.

The control 120 is further illustrated in FIG. 9. Control 120 comprises a hand-held transmitter having several components. The transmitter includes a tone generator 101, which generates a multiplicity of frequencies. In the preferred embodiment, the tone generator 101 generates 5 frequencies comprising 150 Hz, 300 Hz, 600 Hz, 1200 Hz, and 2400 Hz. Additionally, the tone generator 101 creates a carrier frequency of 38 kHz. The frequencies generated by the tone generator 101, except for the carrier frequency, are passed through a microsequencer 103, and ultimately to a mixer 105 where the carrier signal is mixed with the other frequencies generated. The mixed signal is then passed to an amplifier or power driver 107 for ultimate reception at sensors 110 (see FIG. 10). As can be seen from the table which is part of FIG. 9, a four-button selector is provided on the transmitter control 120. The first frequency sent, regardless of the combination selected, is 150 Hz, and the last signal sent is 2400 Hz. It should be noted that selecting different signal combinations on the control 120 will result in actuation of a different ball or plug 122 in an assembly involving a stack of units.

Figure 10:
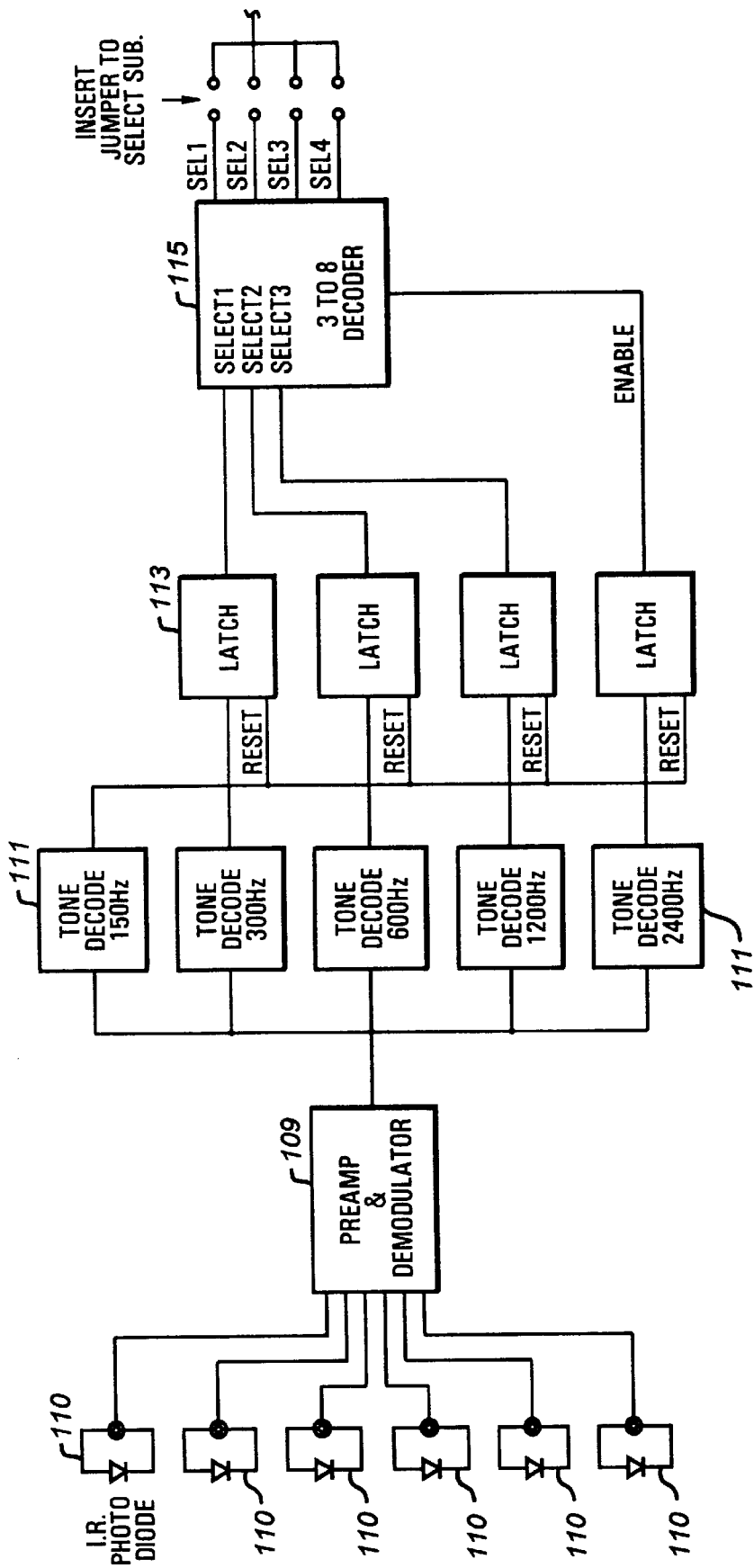
FIGS. 10 and 11 represent the electrical schematic layout of the components to receive the signal from the transmitter and to operate a valve to initiate release of a ball or plug.
Figure 11:
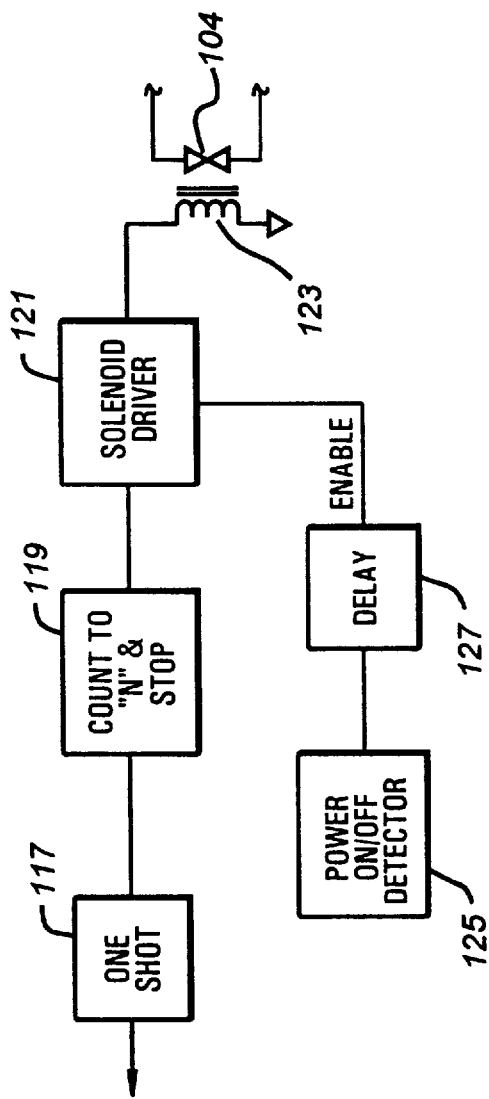

Referring now to FIG. 10, any one of the sensors 110 can pick up the transmitted signal and deliver it to the pre-amp and demodulator 109. The carrier frequency of 38 kHz is eliminated in the pre-amp and demodulator, and the individual frequency signals sent are sensed by the various tone decoders 111. Each of the tone decoders 111 are sensitive to a different frequency. When the tone decoder for the 150 Hz detects that frequency, it resets all of the latches 113. The latches 113 emit a binary output dependent upon the input from the tone decoders 113. When the last frequency is detected, that being the 2400 Hz frequency at the decoder 111, the latch 113 associated with the decoder for the 2400 Hz frequency enables the decoder 115 to accept the input from the remaining latches 113 to generate a suitable output which will ultimately trigger valve 104 to open. Again, depending on the binary input to the decoder 115, discrete signals result as the output from decoder 115, which result in a signal transmitted to one shot 117, shown in FIG. 11. The one shot 117 triggers a timer 119, which in the preferred embodiment is set for keeping the valve 104 in the open position for 4 minutes. The signal to timer 119 also passes to solenoid driver 121, which is a switch that enables the solenoid 123 to ultimately open valve 104. As a safety precaution to avoid release of any ball or plug 122 if the power supply becomes weak or is otherwise interrupted, there is a power on/off detector 125, which is coupled to a delay 127. If the available power goes below a predetermined point, the solenoid 123 is disabled from opening. Thereafter, if the power returns above a preset value, the requirements of time in delay 127 must be met, coupled with a subsequent signal to actuate solenoid 123, before it can be operated. The power supply to the control circuits is provided by a plurality of batteries that are hooked up in parallel. These batteries are rechargeable and are generally recharged prior to use of the assembly on each job. The batteries singly are expected to have sufficient power to conclude the desired operations.

In another safety feature of the apparatus, in making the initial rotation of handle 52 to set the apparatus A up for release, if for any time during the rotation of handle 52 it is released, check valve 102 will prevent its slamming back to its original position due to spring 96, which could cause injury to personnel. By use of check valve 102, the initial movement of handle 52 is ensured to be unidirectional so that it holds its ultimate position when released simply because the fluid in the circuit in lines 100 and 106 cannot flow from conduit 106 back to conduit 100 with check valve 102 installed and solenoid valve 104 closed.

It should be noted that the preferred embodiment having been illustrated, the scope of the invention is broad enough to encompass alternative mechanisms for creating the necessary motion to release a ball or plug 122 by virtue of a remote, over-the-air signal.

The foregoing disclosure and description of the invention are illustrative and explanatory thereof, and various changes in the size, shape and materials, as well as in the details of the illustrated construction, may be made without departing from the spirit of the invention.

We claim:

1. A control system useful in outdoor environments, comprising:

a primary control element operating in a system;

at least one transmitter for sending a predetermined plurality of frequencies over the air;

at least one signal receiver for receiving said predetermined plurality of frequencies from said transmitter to provide an output;

at least one signal processor to receive the output of said receiver and to generate a command signal to said control element;

at least one of said frequencies serving a dual purpose of being first part of a received signal sent to said processor to allow said processor to issue an output signal to operate a primary controlled element, and second to act as a cue to said processor that an incoming multiple frequency signal is about to come or has concluded; and said processor discriminates for said frequencies and generates an output signal to said primary control element based on the order of frequencies received.

2. A well control system, comprising:

a primary control element operating in a well system;

at least one transmitter for sending a predetermined plurality of frequencies order over the air;

at least one signal receiver for receiving said predetermined plurality of frequencies from said transmitter to provide an output;

at least one signal processor to receive the output of said receiver and to generate a command signal to said control element;

at least one of said frequencies serving a dual purpose of being first part of a received signal sent to said processor to allow said processor to issue an output signal to operate a primary controlled element, and second to act as a cue to said processor that an incoming multiple frequency signal is about to come or has concluded; and said processor discriminates for said frequencies and generates an output signal to said primary control element based on the order of the frequencies received.

3. The apparatus of claim 1, wherein:

at least a first and second frequency serve a dual purpose and are part of a sequence of signals that triggers an output from said processor;

said first frequency is first in time and cues said processor that a multifrequency signal is arriving, said second frequency is last in time and cues said processor that a multifrequency signal is fully transmitted, thus triggering said processor to issue an output signal for actuation of the primary controlled element.

4. The apparatus of claim 3, wherein:

said receiver further comprises a self-contained power supply;

interlock means on said power supply to prevent actuation of the primary controlled element unless a preset value of power exists for a preset time.

5. The apparatus of claim 2, wherein:

at least a first and second frequency serve a dual purpose and are part of a sequence of signals that triggers an output from said processor;

said first frequency is first in time and cues said processor that a multifrequency signal is arriving, said second frequency is last in time and cues said processor that a multifrequency signal is fully transmitted, thus triggering said processor to issue an output signal for actuation of the primary controlled element.

6. The apparatus of claim 5, wherein:

said receiver further comprises a self-contained power supply;

interlock means on said power supply to prevent actuation of the primary controlled element unless a preset value of power exists for a preset time.

* * * * *

(12) EX PARTE REEXAMINATION CERTIFICATE (8905th)

United States Patent
Baugh et al.

(10) Number: US 5,856,790 C1
(45) Certificate Issued: Mar. 20, 2012

(54) REMOTE CONTROL FOR A PLUG-DROPPING HEAD

(75) Inventors: John Lindley Baugh, Houston, TX (US); Steven C. Owens, Katy, TX (US); David E. Rothers, Houston, TX (US); Michael W. Holcombe, Houston, TX (US)

(73) Assignee: Baker Hughes Inc., Houston, TX (US)

Reexamination Request:
No. 90/011,191, Aug. 27, 2010

Reexamination Certificate for:
Patent No.: 5,856,790
Issued: Jan. 5, 1999
Appl. No.: 08/644,889
Filed: May 10, 1996

Related U.S. Application Data

(62) Division of application No. 08/068,513, filed on May 27, 1993, now Pat. No. 5,435,390.

(51) Int. Cl.
*G01V 3/00* (2006.01)

(52) U.S. Cl. ............... 340/854.6; 340/855.3; 340/855.4; 340/870.26; 166/250.01; 175/40

(58) Field of Classification Search ............... 340/854.6, 340/855.3, 855.4, 870.26; 175/40; 166/250.01
See application file for complete search history.

(56) References Cited

To view the complete listing of prior art documents cited during the proceeding for Reexamination Control Number 90/011,191, please refer to the USPTO's public Patent Application Information Retrieval (PAIR) system under the Display References tab.

*Primary Examiner* — Matthew C. Graham

(57) ABSTRACT

An apparatus and method of dropping a pumpdown plug or ball is revealed. The assembly can be integrally formed with a plug-dropping head or can be an auxiliary feature that is mounted to a plug-dropping head. The release mechanism is actuated by remote control, employing intrinsically safe circuitry. The circuitry, along with its self-contained power source, actuates a primary control member responsive to an input signal so as to allow component shifting for release of the pumpdown plug or ball. Multiple plug-dropping heads can be stacked, each responsive to a discrete release signal. Actuation to drop the pumpdown ball or plug is accomplished even while the components are rotating or are moving longitudinally. Using the apparatus and method of the present invention, personnel do not need to climb up in the derrick to actuate manual valves. There is additionally no need for a rig floor-mounted control panel with hydraulic lines extending from the control panel to remotely located valves for plug or ball release.

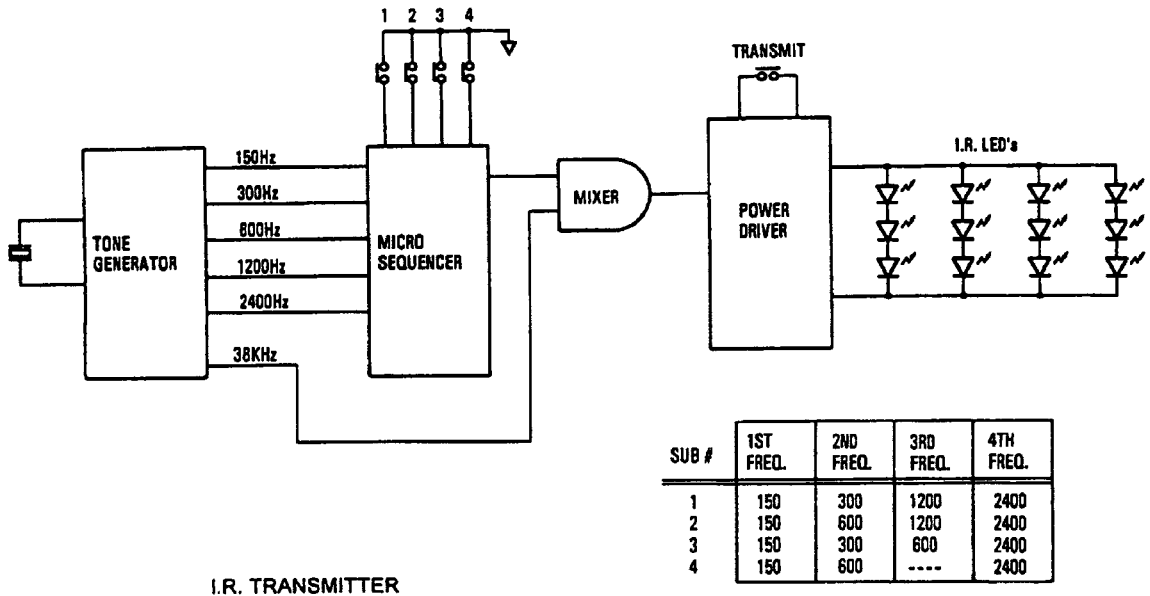

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *